(12) United States Patent
Brüninghaus et al.

(10) Patent No.: US 9,035,753 B2
(45) Date of Patent: May 19, 2015

(54) OPERATOR CONTROL DEVICE

(75) Inventors: Andreas Brüninghaus, Wiehl (DE); Thorsten Alexander Kern, Alsbach (DE); Vitali Kudaschov, Bad Vilbel (DE)

(73) Assignee: Centinental Automotive GmbH, Hannover (DE)

( * ) Notice: Subject to any disclaimer, the term of this patent is extended or adjusted under 35 U.S.C. 154(b) by 148 days.

(21) Appl. No.: 13/982,924

(22) PCT Filed: Jan. 30, 2012

(86) PCT No.: PCT/EP2012/051408
§ 371 (c)(1),
(2), (4) Date: Aug. 28, 2013

(87) PCT Pub. No.: WO2012/104235
PCT Pub. Date: Aug. 9, 2012

(65) Prior Publication Data
US 2013/0328670 A1      Dec. 12, 2013

(30) Foreign Application Priority Data
Jan. 31, 2011   (DE) .......................... 10 2011 009 840

(51) Int. Cl.
*G08B 6/00*         (2006.01)
*B60R 11/02*        (2006.01)
(Continued)

(52) U.S. Cl.
CPC . *G08B 6/00* (2013.01); *B60R 11/02* (2013.01); *H04M 1/04* (2013.01); *G06F 1/1632* (2013.01); *B60R 2011/0075* (2013.01); *G06F 3/016* (2013.01); *H04M 2250/22* (2013.01); *B60K 2350/1004* (2013.01); *B60K 2350/1028* (2013.01); *B60K 2350/1032* (2013.01); *B60K 2350/1052* (2013.01); *B60K 2350/352* (2013.01); *B60K 2350/941* (2013.01);
(Continued)

(58) Field of Classification Search
CPC ................................. G08B 6/00; B60R 11/02
USPC ........... 340/407.2, 438, 686.4, 4.12; 710/303; 713/1; 701/33.2; 455/575.9
See application file for complete search history.

(56) References Cited

U.S. PATENT DOCUMENTS 6,539,358 B1 *   3/2003   Coon et al. .................... 704/275
6,993,615 B2 *   1/2006   Falcon ......................... 710/303
(Continued)

FOREIGN PATENT DOCUMENTS

DE   10 2010 007 486        8/2011
DE   10 2010 007 486 A1     8/2011
(Continued)

*Primary Examiner* — Toan N Pham
(74) *Attorney, Agent, or Firm* — Cozen O'Connor

(57) ABSTRACT

An operator control device for an on-board electronics system of a motor vehicle or for a mobile communications device, having an operator control unit arranged in a receptacle of a docking station located in the interior of the motor vehicle and an interface between the operator control unit and the docking station for data interchange of information. The operator control unit has an operator control panel which has a plurality of operator control elements which can be manually operated. The receptacle with the operator control unit accommodated therein can be driven so as to move in an alternating rhythm, which is associated with the respectively operated operator control element, by one or more actuators when one of the operator control elements is operated.

16 Claims, 2 Drawing Sheets

(51) Int. Cl.
*H04M 1/04* (2006.01)
*G06F 1/16* (2006.01)
*B60R 11/00* (2006.01)
*G06F 3/01* (2006.01)

(52) U.S. Cl.
CPC .... *B60K 2350/946* (2013.01); *B60K 2350/948* (2013.01); *B60K 2350/962* (2013.01); *B60K 2350/965* (2013.01)

(56) References Cited

U.S. PATENT DOCUMENTS

| | | | |
|---|---|---|---|
| 8,634,033 B2 * | 1/2014 | Vanderwall et al. | 348/837 |
| 2002/0152027 A1 * | 10/2002 | Allen | 701/213 |
| 2004/0075676 A1 | 4/2004 | Rosenberg et al. | |
| 2007/0057927 A1 | 3/2007 | Prados | |
| 2009/0051509 A1 | 2/2009 | Hwang | |
| 2009/0166098 A1 | 7/2009 | Sunder | |
| 2009/0292851 A1 | 11/2009 | Mead et al. | |
| 2010/0045612 A1 | 2/2010 | Mölne | |
| 2012/0306798 A1 | 12/2012 | Zoller et al. | |

FOREIGN PATENT DOCUMENTS

| | | |
|---|---|---|
| EP | 1 764 674 | 3/2007 |
| EP | 1 764 674 A2 | 3/2007 |
| WO | WO 2008/030594 | 3/2008 |
| WO | WO 2008/030594 A2 | 3/2008 |

* cited by examiner

OPERATOR CONTROL DEVICE

CROSS REFERENCE TO RELATED APPLICATIONS

This is a U.S. national stage of application No. PCT/EP2012/051408, filed on Jan. 30, 2012. Priority is claimed on German Application No. DE102011009840.2, filed Jan. 31, 2011, the content of which is incorporated herein by reference.

BACKGROUND OF THE INVENTION

1. Field of the Invention

The invention relates to an operator control device for onboard electronics in a motor vehicle or for a mobile communication appliance, having an operator control unit arranged in a slot in a docking station situated in the interior of the motor vehicle, having an interface between the operator control unit and the docking station for the data interchange of information, wherein the operator control unit has an operator control panel having a plurality of manually operable operator control elements. Such operator control devices are also intended to allow the operator control elements to be operated while the motor vehicle is being driven.

2. Description of the Prior Art

The ergonomics of the operation of the operator control unit, particularly of a PDA or smart phone, require conscious visual concentration on the operator control panel and possibly the contents presented thereon.

However, such concentration on the operator control panel results in dangerous distraction from what is happening on the road.

SUMMARY OF THE INVENTION

It is therefore an object of one embodiment of the invention to provide operator control instructions of the type cited at the outset that can be operated without substantially distracting the driver of a motor vehicle from what is happening on the road.

In one embodiment of the invention, when one of the operator control elements is operated, the slot with the operator control unit held therein can be driven moveably by one or more actuators in an alternating rhythm associated with the respectively operated operator control element.

This design allows the operator control elements of the operator control panel to be operated by the driver of the motor vehicle without substantial distraction from what is happening on the road by virtue of being able to haptically carry out controlled movement and manual navigation on the operator control panel, without directing his eyes thereto.

Therefore, the operator control unit may easily be arranged within the direct grasp of the driver.

The operator control unit may be a PDA (Personal Digital Assistant) or a smart phone. Operation of the operator control elements effects data interchange of information with the onboard electronics of a motor vehicle to control motor vehicle functions.

Alternatively, it is possible for the operator control unit to be a cellular telephone or smartphone (iphone) where haptic feedback is provided when the operator control elements thereof are operated.

The interface may comprise a mechanical contact or a wireless data link using Bluetooth or infra-red.

If the operator control unit can be arranged in a slot with a mechanically rigid connection to the slot, the rhythm alternately acting upon the slot by virtue of the actuator or the actuators is transmitted, and can be detected, particularly well.

The slot with the operator control unit held therein can be driven moveably in the alternating rhythm in and/or transversely with respect to the plane of the operator control panel, with good haptic detectability existing when the slot with the operator control unit held therein can be driven moveably in the alternating rhythm at accelerations between 5 g and 10 g.

It is self-evident that this is a preferred range. The acceleration may also be higher or lower.

Largely direct and hence good transmission of the movement drive to the operator control unit is achieved by virtue of the slot being formed in the manner of a tray with a base, and the actuator or the actuators being arranged in the slot on that side of the base that is remote from the operator control unit.

A compact design requiring little installation space is obtained when the side of the base of the slot that is remote from the operator control unit holds actuator electronics for controlling the actuator or the actuators.

Besides the interchange of information between PDA or smart phone and the onboard electronics, it is also possible, in a dual function, for the operator control unit to be able to use the interface to supply information about the respectively operated operator control element to a haptic and effect driver, which can supply appropriate haptic information to the actuator or to the actuators or the actuator electronics in order to control the actuator or the actuators, as a result of which a second interface is not required.

An effect memory can store effect data that is respectively associated with the operator control elements, which effect data can be retrieved by the haptic and effect driver.

In addition, the software for operating the actuator or the actuators and/or the actuator electronics and/or the haptic and effect driver and/or for transmitting the effect data to the effect memory can preferably be supplied to the onboard electronics and/or to the haptic and effect driver and/or to the actuator electronics and/or to the effect memory by the operator control unit via the interface.

If the operator control panel of the operator control unit is a touchscreen having a display panel and having touch panels that form the operator control elements, then a haptic detection of the operator control elements is of particular advantage, since touchscreens detect movements more or less without contact forces just using, by way of example, capacitive tough sensors, which would complicate or prevent controlled movement and manual navigation without visual observation.

BRIEF DESCRIPTION OF THE DRAWINGS

An exemplary embodiment of the invention is shown in the drawing and is described in more detail below. In the drawing.

DETAILED DESCRIPTION OF THE PRESENTLY PREFERRED EMBODIMENTS

Figure 2:
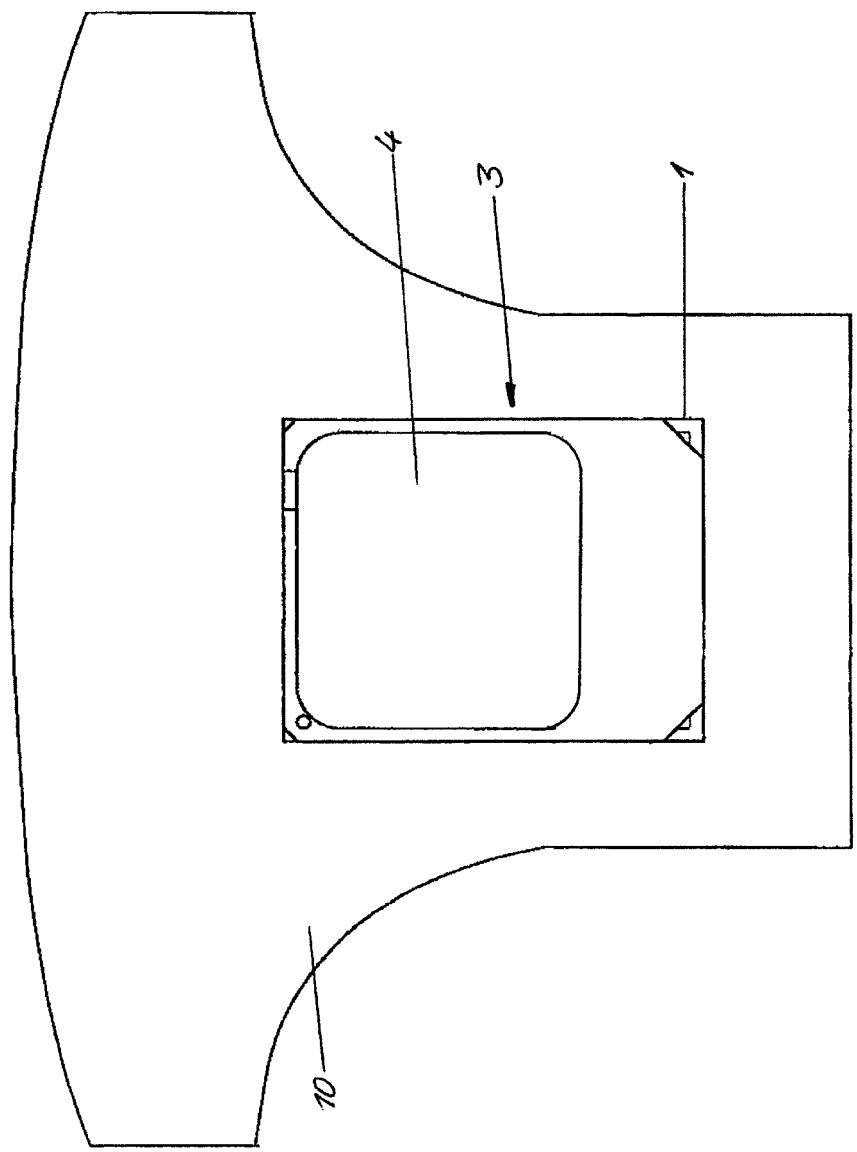
FIG. 2 is a view of a detail from a dashboard with an operator control device as shown in FIG. 1.

The operator control device shown has a tray-like slot 1 or recess in a docking station, which is firmly arranged on the center console or on the dashboard 10 in the interior of a motor vehicle, for example (FIG. 2).

Figure 1:
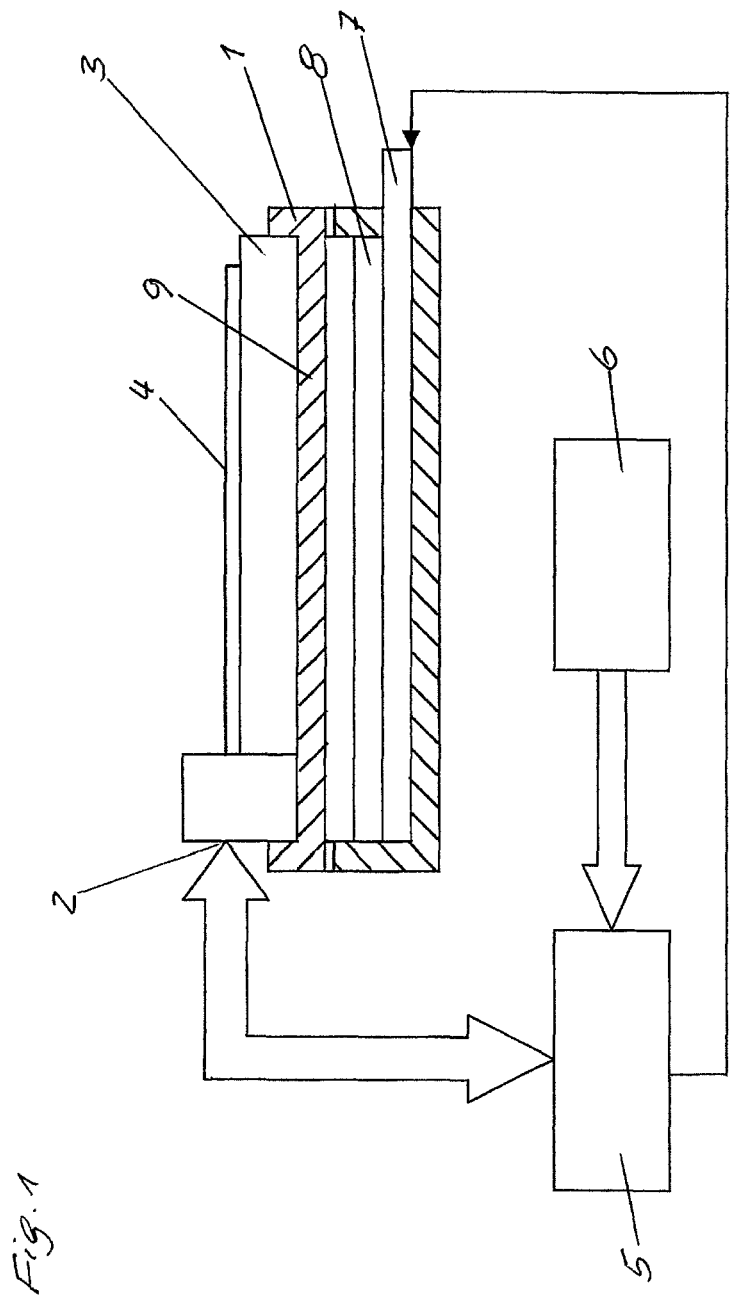
FIG. 1 is a basic illustration of an operator control device for onboard electronics in a motor vehicle.

As shown in FIG. 1, slot 1 has an interface 2 for connecting the electronics of a smart phone 3 inserted into the slot 1 in mechanically rigid fashion to the onboard electronics of the motor vehicle for the purpose of data interchange.

The smart phone 3 has an operator control panel, in the form of a touchscreen 4, with touch panels that form operator control elements that have respective associated capacitive touch sensors.

In addition, the interface 2 can be used to supply information stored in the smart phone 3 to a haptic and effect driver 5 using the touch panels of the touchscreen 4.

An effect memory 6 stores effect data that can be retrieved by the haptic and effect driver 5.

Depending on the touch panel that is approached and/or operated by an operating hand of an operator, the haptic and effect driver 5 is accordingly supplied with a piece of information from the smart phone 3, retrieves the associated effect data from the effect memory 6 and conditions corresponding haptic information.

This haptic information associated with a particular touch panel is supplied to actuator electronics 7 that control an actuator 8.

The actuator 8, which is arranged below a base 9 of the slot 1 and above the actuator electronics 7, then drives the slot 1 to produce an alternating rhythmic movement pattern that is individual to the operated touch panel at accelerations of approximately 7 g for the slot 1. This is then detected haptically by the operating hand of the operator as being associated with the operated touch panel.

In this way, operation of the smart phone 3 requires no observation of the touchscreen 4 but rather just haptic detection of the position on the touchscreen 4 from the individual movement patterns of the smart phone 3 that is being firmly inserted into the slot 1.

The actuators 8 used may be any type of actuators that produce rhythmic movement patterns. A suitable type of actuators is described in DE 10 2010 007 486.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An operator control device for at least one of onboard electronics in a motor vehicle and a mobile communication appliance, comprising:
    an operator control unit having an operator control panel with a plurality of manually operable operator control elements;
    a docking station situated in the interior of the motor vehicle having a reception configured to receive the operator control unit;
    an interface arranged between the operator control unit and the docking station configured for a data interchange of information; and
    at least one actuator configured to drive the operator control unit in the reception when one of the operator control elements is operated in a rhythm associated with the respectively operated operator control element.

2. The operator control device as claimed in claim 1, wherein the operator control unit is arranged in the reception by a mechanically rigid connection to the reception.

3. The operator control device as claimed in claim 1, wherein the reception with the operator control unit held therein is configured to be driven moveably in driven in at least one of the rhythm, an alternating rhythm, and transversely with respect to a plane of the operator control panel.

4. The operator control device as claimed in claim 3, wherein the reception with the operator control unit held therein can be driven moveably at accelerations between about 5 g and about 10 g.

5. The operator control device as claimed in claim 1, wherein the reception is a tray with a base, and the at least one actuator is arranged in the reception on a side of the base that is remote from the operator control unit.

6. The operator control device as claimed in claim 5, wherein actuator electronics configured to control the at least one actuator are arranged on the side of the base of the reception that is remote from the operator control unit.

7. The operator control device as claimed in claim 6, further comprising:
    a haptic and effect driver, configured to supply haptic information to the actuator electronics to control the at least one actuator
    wherein the operator control unit is configured to use the interface to supply information about the respectively operated operator control element to the haptic and effect driver.

8. The operator control device as claimed in claim 7, wherein an effect memory stores effect data associated that can be retrieved by the haptic and effect driver.

9. The operator control device as claimed in claim 8, wherein software is supplied to at least one of the onboard electronics, the haptic and effect driver, the actuator electronics, and the effect memory by the operator control unit via the interface, for at least one of:
    operating at least one of the at least one of the at least one actuator, the actuator electronics, and the haptic and effect driver; and
    transmitting effect data to the effect memory.

10. The operator control device as claimed in claim 9, wherein the operator control panel of the operator control unit is a touchscreen having a display panel and at least one touch panel configured as the operator control elements.

11. The operator control device as claimed in claim 9, wherein the reception is a slot.

12. The operator control device as claimed in claim 1, further comprising:
    a haptic and effect driver, configured to supply haptic information to the at least one actuator to control the at least one actuator
    wherein the operator control unit is configured to use the interface to supply information about the respectively operated operator control element to the haptic and effect driver.

13. The operator control device as claimed in claim 12, wherein an effect memory stores effect data associated that can be retrieved by the haptic and effect driver.

14. The operator control device as claimed in claim 1, wherein software is supplied to at least one of the onboard electronics, a haptic and effect driver, actuator electronics, and an effect memory by the operator control unit via the interface, for at least one of:

operating the at least one of the at least one actuator, the actuator electronics, and the haptic and effect driver and transmitting effect data to the effect memory.

15. The operator control device as claimed in claim 1, wherein the operator control panel of the operator control unit is a touchscreen having a display panel and at least one touch panel configured as the operator control elements.

16. The operator control device as claimed in claim 1, wherein the rhythm is an alternating rhythm.

\* \* \* \* \*